United States Patent [19]

Stournas

[11] 4,340,492

[45] Jul. 20, 1982

[54] OIL RECOVERY BY SURFACTANT WATERFLOODING

[75] Inventor: Stamoulis Stournas, Flemington, N.J.

[73] Assignee: Mobil Oil Corporation, New York, N.Y.

[21] Appl. No.: 745,323

[22] Filed: Nov. 26, 1976

[51] Int. Cl.³ .............................................. E21B 43/22
[52] U.S. Cl. ................................ 252/8.55 D; 166/274; 166/275
[58] Field of Search ................... 252/8.55 D; 166/274, 166/275

[56] References Cited

U.S. PATENT DOCUMENTS

| | | | |
|---|---|---|---|
| 3,811,504 | 5/1974 | Flournoy et al. | 166/274 X |
| 3,811,505 | 5/1974 | Flournoy et al. | 252/8.55 D X |
| 3,811,507 | 5/1974 | Flournoy et al. | 252/8.55 D X |
| 3,827,497 | 8/1974 | Dycus et al. | 252/8.55 D |
| 3,858,656 | 11/1975 | Flournoy et al. | 252/8.55 D X |
| 3,885,628 | 5/1975 | Reed et al. | 166/274 |
| 3,977,471 | 8/1976 | Gale et al. | 252/8.55 D |
| 3,981,361 | 9/1976 | Healy | 252/8.55 D |

FOREIGN PATENT DOCUMENTS 2558548 9/1976 Fed. Rep. of Germany.

*Primary Examiner*—Herbert B. Guynn
*Attorney, Agent, or Firm*—Charles A. Huggett; Michael G. Gilman; Claude E. Setliff

[57] ABSTRACT

Process for the recovery of oil from a subterranean oil reservoir involving injection into the reservoir of a substantially oil-free aqueous liquid containing a surfactant having a nonionic polyalkylene oxide hydrophilic group and an anionic sulfonate hydrophilic group molecularly linked to a common lipophilic base. The invention is applicable to reservoirs in which the connate waters have relatively high concentrations of divalent ions and in situations in which the water available for injection purposes contains relatively high amounts of divalent ions. Specifically disclosed surfactants include aliphatic aryl polyalkoxyol sulfonates in which the polyalkoxyol group contains at least three alkylene oxide units and is derived from ethylene oxide or propylene oxide or mixtures thereof. The aliphatic groups may be substituted directly on the aryl nucleus or indirectly as through an intermediate succinimido group.

4 Claims, 4 Drawing Figures

OIL RECOVERY BY SURFACTANT WATERFLOODING

BACKGROUND OF THE INVENTION

This invention relates to the recovery of oil from subterranean oil reservoirs and more particularly to improved waterflooding operations involving the injection of surfactants containing both anionic and nonionic polar groups molecularly linked to a common lipophilic base.

In the recovery of oil from oil-bearing reservoirs, it usually is possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the introduction of water into the reservoir through an injection system comprised of one or more wells. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus it has been proposed to add surfactants to the flood water in order to lower the oil-water interfacial tension and/or to alter the wettability characteristics of the reservoir rock. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

Processes which involve the injection of aqueous surfactant solutions in order to reduce the oil-water interfacial tension are commonly referred to as low tension waterflooding techniques. Thus far, most low tension waterflooding applications have employed anionic surfactants. For example, a paper by W. R. Foster entitled "A Low-Tension Waterflooding Process", Journal of Petroleum Technology, Vol. 25, February 1973, pp. 205-210, describes a promising technique involving the injection of an aqueous solution of petroleum sulfonates within designated equivalent weight ranges and under controlled conditions of salinity. The petroleum sulfonate slug is followed by a thickened water slug which contains a viscosifier such as a water-soluble biopolymer in a graded concentration in order to provide a maximum viscosity greater than the viscosity of the reservoir oil and a terminal viscosity near that of water. This thickened water slug is then followed by a driving fluid such as a field brine which is injected as necessary to carry the process to conclusion.

One limitation encountered in waterflooding with certain anionic surfactants such as the petroleum sulfonates is the tendency of the surfactants to precipitate from solution in the presence of even moderate concentrations of divalent metal ions such as calcium and magnesium ions. Another limitation imposed upon the use of such anionic surface-active agents resides in the fact that desired low interfacial tensions can seldom be achieved, even in the absence of divalent metal ions, at salinities significantly in excess of 2 or 3 weight percent.

In view of these limitations, it has been proposed carry out waterflooding employing mixtures of anionic surfactants which will tolerate relatively high salinities and concentrations of divalent metal ions. U.S. Pat. No. 3,508,612 to Reisberg et al. is directed to a low tension waterflooding process employing a mixture of anionic surfactants which can be employed in saline solutions containing from 0.01 to 5 molar NaCl and from about 0 to 0.1 molar $CaCl_2$. One of the anionic surfactants employed in the Reisberg et al. process is an organic sulfonate such as a petroleum sulfonate having an average molecular weight within the range of 430–470 and the other surfactant is a sulfated ethoxylated alcohol. A preferred sulfated alochol is one containing a $C_{12}$–$C_{15}$ alkyl group and three ethylene oxide groups.

Another technique involving the use of a calcium-compatible mixture of anionic surfactants in low tension waterflooding is disclosed in U.S. Pat. No. 3,827,497 to Dycus et al. In this process, a three-component or two-component surfactant system may be employed. The three-component system comprises an organic sulfonate surfactant such as a petroleum sulfonate, a polyalkylene glycol alkyl ether, and a salt of a sulfonated or sulfated oxyalkylated alcohol. The two-component system comprises an organic sulfonate surfactant and a salt of a sulfonated oxyalkylated alcohol. These surfactant systems may be employed in a brine solution which, as noted in column 3, will usually contain about 0.5–8 percent sodium chloride and will often contain 50–5,000 ppm polyvalent metal ions such as calcium and/or magnesium ions. The sulfated or sulfonated oxyalkylated alcohols may be derived from aliphatic alcohols of 8–20 carbon atoms or from alkyl phenols containing 5–20 carbon atoms per alkyl group. The oxyalkyl moiety in this surfactant will usually be derived from ethylene oxide although other lower alkylene oxides containing 2–6 carbon atoms or mixtures thereof may be employed.

A number of recent patents are directed to the use of mixtures of anionic and nonionic surfactants in low tension waterfloods carried out in the presence of high divalent metal ion concentrations. For example, U.S. Pat. No. 3,811,505 to Flournoy et al. discloses a mixture of anionic and nonionic surfactants for use in formations containing water having concentrations of divalent ions such as calcium and magnesium within a range of about 500 to about 9,000 parts per million. The nonionic surfactants employed in the Flournoy et al. process include polyethoxylated alkyl phenols in which the alkyl group has from 5–20 carbon atoms and polyethoxylated aliphatic alcohols having from 5–20 carbon atoms. These surfactants are said to contain from 6–20 ethylene oxide groups. The anionic surfactants employed include alkyl sulfonates and phosphates having from 5–25 carbon atoms and alkylaryl sulfonates and phosphates having from 5–25 carbon atoms in the alkyl groups. Both the anionic and nonionic surfactants may be employed in concentrations within the range of 0.05 to 5.0 percent with the ratio of anionic surfactant to nonionic surfactant being about 0.1 to about 10.

U.S. Pat. No. 3,811,504, also to Flournoy et al., is directed to a low tension waterflood process for use in environments exhibiting a polyvalent ion concentration of about 1,500 to about 12,000 parts per million and which employs a three-component surfactant system containing two anionic surfactants and one nonionic surfactant. One of the anionic surfactants is an alkyl or alkylaryl sulfonate and the other anionic surfactant is an alkyl polyethoxy sulfate. The nonionic surfactant may be a polyethoxylated alkyl phenol or a polyethoxylated aliphatic alcohol as disclosed in the previously mentioned Flournoy et al. patent or it may take the form of fatty acid dialkanolamide or a fatty acid monoalkanolamide in which the fatty acid contains from 5-20 carbon atoms. In this process as in the previously described Flournoy et al. patent, a thickening agent such as a polyacrylamide or polysaccharide may be added to the surfactant slug or to a subsequently injected slug. In addition the surfactant slug may be preceded by a sacrificial agents such as sodium polyphosphate or sodium carbonate.

SUMMARY OF THE INVENTION

In accordance with the present invention, there is provided a new and improved waterflooding process employing a water-soluble anionic-nonionic surfactant and which is particularly suitable in reservoirs in which the connate waters exhibit a relatively high salt content, including divalent metal salts, or which may be employed in waterfloods in which the available injection waters exhibit a relatively high salt content. In carrying out the invention, at least a portion of the fluid injected into the reservoir comprises a substantially oil-free aqueous liquid containing a surfactant which has a nonionic polyalkylene oxide hydrophilic group and an anionic sulfonate hydrophilic group both of which are molecularly linked to a common lipophilic base. In a more specific aspect of the invention, the anionic-nonionic surfactant comprises an aliphatic aryl polyalkoxyol sulfonate wherein the polyalkoxyol chain contains at least 3 alkylene oxide units having 2 or 3 carbon atoms therein. A preferred aliphatic aryl polyalkoxyol sulfonate for use in the present invention is characterized by the formula:

wherein
R is an aliphatic group, an aliphatic-substituted succinimido group, or the corresponding succinamic acid derivative of said aliphatic-substituted succinimido group,
Ar is a mononuclear or condensed ring dinuclear aryl group,
Ao is a polyalkylene oxide having a terminal hydroxyl group and containing at least 3 alkylene oxide units having 2 or 3 carbon atoms therein,
n is 1 or 2,
M is an alkali metal, ammonium, or substituted ammonium ion, and
$n_1$ is 1 or 2.

DESCRIPTION OF SPECIFIC EMBODIMENTS

Figure 1:
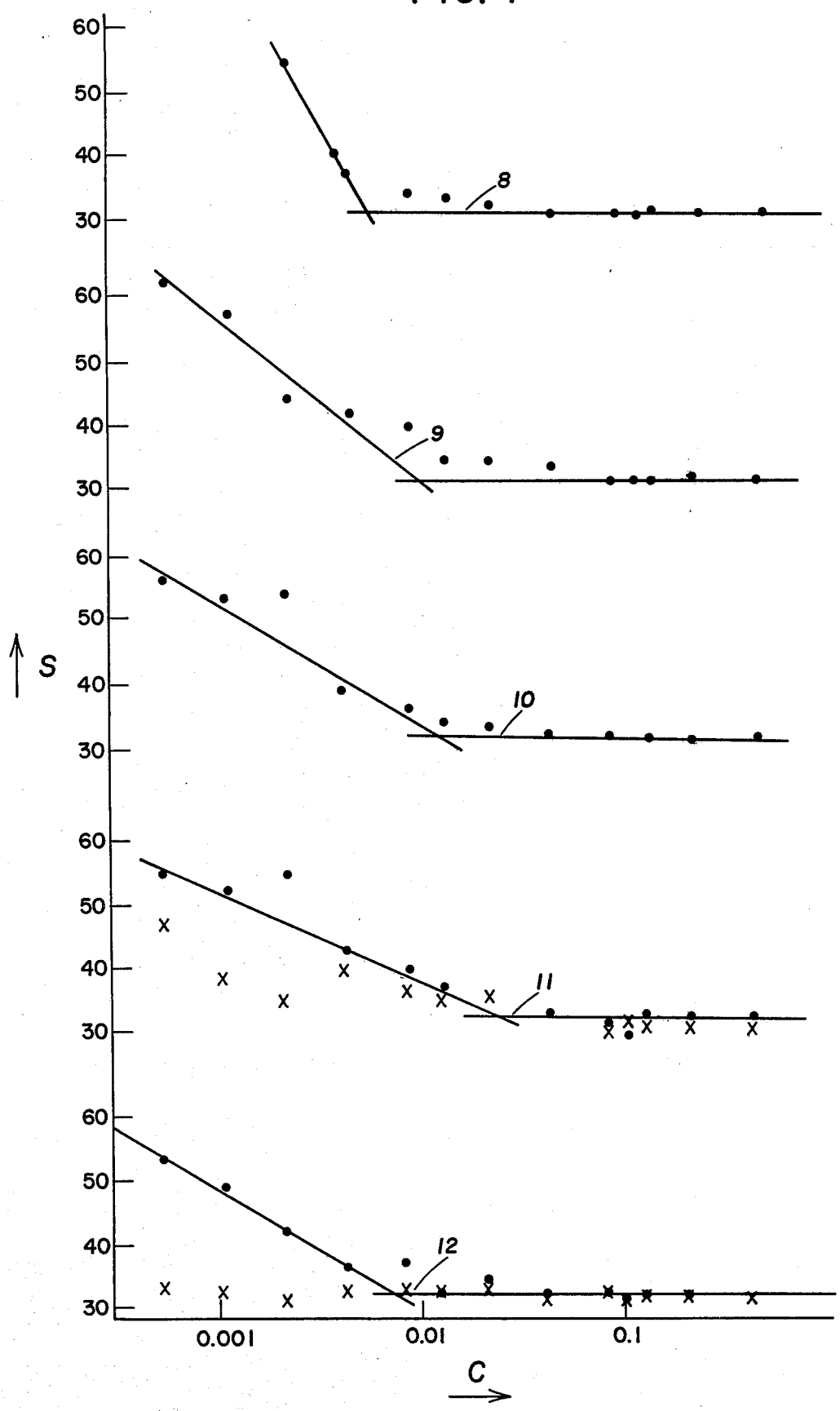
FIGS. 1, 2, and 3 are graphs illustrating surface tensions measured for various mixed brine solutions of anionic-nonionic surfactants of the present invention.

As recognized by those skilled in the art, many of the chemical additives employed in waterflooding procedures are subject to adsorption onto the reservoir rock surfaces. Such additives thus move through the reservoir by a chromatographic adsorption-desorption process in which the adsorbing solute moves at a rate lower than the aqueous liquid in which it is dissolved. The rate at which a given solute is chromatographically transported through the reservoir depends upon the adsorption characteristics of the solute in the liquid-solid system. Thus a strongly adsorbing solute is chromatographically transported through the reservoir at a rate lower than that of a solute which is less adsorbing.

In view of the foregoing considerations, it can be seen that the several surfactant components of a surfactant mixture are subject to chromatographic separation as the surfactant slug is moved through the reservoir. A number of factors can influence the degree of adsorption and thus the chromatographic transport rate of such surfactant components. For example, species of different molecular weights or water solubilities will exhibit different adsorption characteristics in a given liquid-solute system. Thus for a mixture of different molecular weight petroleum sulfonates, the higher molecular weight petroleum sulfonates can be expected to adsorb at a greater rate than the lower molecular weight petroleum sulfonates and thus move through the reservoir at a lower transport rate. The surface characteristics of the adsorbing substrate can also be expected to influence the surfactant adsorption. Most petroleum reservoirs contain clay surfaces having negatively and positively charged sites with the negatively charged sites usually predominating. In a mixture of anionic and nonionic surfactants such as disclosed in the aforementioned patents to Flournoy et al., the negatively charged sites tend to retard adsorption of the anionic surfactant while presenting adsorption sites to the nonionic surfactant. The nonionic surfactant thus adsorbs preferentially with respect to the anionic surfactant resulting ultimately in chromatographic separation of the surfactant components.

The present invention offers a means of achieving tolerance to monovalent and divalent salts exhibited by mixtures of anionic and nonionic surfactants while at the same time of avoiding the limitations imposed by chromatographic separation of the components of such surfactant mixtures. This is accomplished by employing a surfactant having a nonionic polyalkylene oxide hydrophilic group linked to a lipophilic base and also an anionic sulfonate hydrophilic group also linked to the same lipophilic base. By linking the anionic and nonionic groups to the same structure, the chromatographic separation attendant to the use of surfactant mixtures is avoided. At the same time as indicated by the laboratory data presented hereinafter, the polyfunctional surfactants of this invention exhibit surface-active characteristics in the presence of high salt concentrations and are not subject to salting out in these environments.

The anionic-nonionic surfactants are employed in accordance with the present invention in a "substantially oil-free aqueous liquid". The quoted expression is used herein to distinguish the present invention which involves an application of low tension waterflooding from those procedures which involve the injection of oil-water-surfactant—co-surfactant systems characterized in the prior art as "microemulsions", "transparent emulsions", or "micellar solutions". Thus U.S. Pat. No. 3,885,628 to Reed et al. is directed to oil recovery by the injection of microemulsions and discloses the use of sulfonated ethoxylated phenols as co-surfactants. The microemulsions of Reed et al. include substantial quantities of oil. In contrast the aqueous surfactant solutions of the present invention are free of oil or contain only minor amounts of oil, i.e. less than one percent, such as may be present as an impurity.

A suitable class of anionic-nonionic surfactants useful in the practice of the invention may be characterized as aliphatic aryl polyalkoxyol sulfonates. The term "polyalkoxyol" is employed herein to designate the nonionic alkylene oxide chain as a terminal functional group as distinguished from polyalkoxylated sulfonates of the type disclosed, for example, in the aforementioned patent to Dycus. As will be recognized by those skilled in the art, surfactants of this type are anionic only, with the polyalkylene oxide chain providing an ether linkage between the sulfonate group and the lipophilic base. The polyalkoxyol group in the anionic-nonionic surfactants of the present invention contains at least 3 alkylene oxide units and is derived from ethylene oxide or propylene oxide or mixtures of ethylene and propylene oxide. Stated otherwise, each alkylene oxide unit in the polyalkoxyol chain has 2 or 3 carbon atoms therein.

The lipophilic base of the anionic-nonionic surfactants is provided by an aliphatic substituted aryl group in which the aryl component is mononuclear or polynuclear and contains 1 or more aliphatic substituents. The aliphatic substituents may be unsaturated and/or contain branched chains but usually will take the form of normal alkyl groups. The aliphatic groups may be substituted directly on the aryl nucleus or may contain an intermediate linkage as in the case of the alkyl succinimido aryl polyalkoxyol sulfonates described hereinafter.

In a preferred embodiment of the invention, the anionic-nonionic surfactant employed in the injected aqueous liquid contains a mononuclear or condensed ring dinuclear aryl group, e.g. benzene or naphthalene, which is substituted with 1 or 2 polyalkoxyol groups and 1 or 2 sulfonate groups. The lipophilic base is completed with an aliphatic group substituted on the aryl group directly or by means of an intermediate linkage provided by a succinimido group or the corresponding succinamic acid derivative of the succinimido group. These aliphatic aryl polyalkoxyol sulfonates may be characterized by the formula:

 (1)

wherein
R is an aliphatic group, an aliphatic-substituted succinimido group, or the corresponding succinamic acid derivative of said aliphatic-substituted succinimido group,
Ar is a mononuclear or condensed ring dinuclear aryl group,
Ao is a polyalkylene oxide having a terminal hydroxyl group and containing at least 3 alkylene oxide units having 2 or 3 carbon atoms therein,
n is 1 or 2,
M is an alkali metal, ammonium, or substituted ammonium ion, and
$n_1$ is 1 or 2.

Where M is an alkali metal ion, it usually will take the form of sodium or potassium. Substituted ammonion ions which may be employed include mono-, di-, or tri-substituted alkyl ammonium or alkanol ammonium ions. Examples of alkyl ammonium ions include methyl ammonium, ethyl ammonium, and normal- or iso-propyl ammonium ions. Examples of alkanol ammonium ions include monoethanol ammonium and triethanol ammonium ions.

In the case where R is an aliphatic group directly substituted on the aryl nucleus, the aliphatic substituent normally will contain from 8–30 carbon atoms. Where an intermediate linkage between the aliphatic group and the aryl nucleus is provided by a succinimido group, or its corresponding succinamic acid derivative, the aliphatic group normally will contain from 8–25 carbon atoms.

The aliphatic aryl polyalkoxyol sulfonates with an intermediate succinimido linkage in accordance with the present invention may be characterized by the formula:

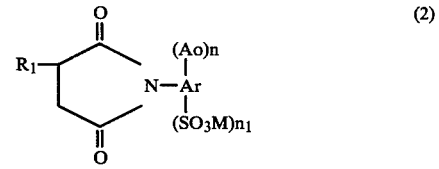 (2)

wherein
$R_1$ is an aliphatic group and
Ar, Ao, n, M, and $n_1$ are as defined previously.

The succinimido group is subject to hydrolysis at a pH within the alkaline range and/or at elevated temperatures to form the corresponding succinamic acid derivative which may be characterized by the formula:

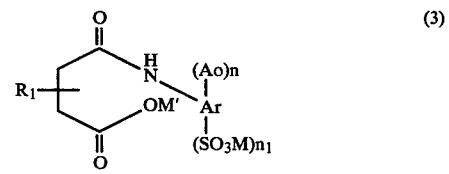 (3)

wherein $R_1$, Ar, Ao, n, M, and $n_1$ are as described previously and M' is the same as M or is hydrogen. At room temperature and at a pH on the order of 9, about one-half of the succinimido linked surfactant characterized by formula (2) will be converted to its corresponding succinamic acid derivative characterized by formula (3) in a matter of several days. At elevated temperatures on the order of 200° F., the rate of hydrolysis is accelerated so that most of the succinimido aryl surfactant is converted to its corresponding succinamic acid derivative in a matter of several hours. Even at the neutral or near neutral pH conditions encountered in most subterranean oil reservoirs, the hydrolysis reaction can be expected to take place although at a significantly lower rate. Accordingly, injection of the succinimido surfactant characterized by formula (2) will result, because of hydrolysis in the reservoir, in a mixture of the surfactants characterized by formulas (2) and (3). It may be noted here, however, that the polyalkoxyol and sulfonate groups will still be linked to a common molecular structure so that chromatographic separation of the anionic and nonionic groups will not occur.

In a preferred embodiment of the invention, the anionic-nonionic surfactant injected into the subterranean oil reservoir is a sulfonated ethoxylated aliphatic phenol characterized by the formula:

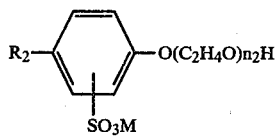
(4)

wherein $R_2$ is an aliphatic group containing from 8–30 carbon atoms, $n_2$ is a number within the range of 3–20, and M is an alkali metal, ammonium, or substituted ammonium ion. As indicated by formula (4), the polyethylene oxide group is in the para position with respect to the aliphatic group. The sulfonate group may be either ortho or meta with respect to the aliphatic group.

The aliphatic aryl polyalkoxyol sulfonates employed in the present invention may be prepared by sulfonating the corresponding alkoxylated compound after first esterifying the end of the polyalkylene oxide group to remove the terminal hydroxy as a sulfation site. Esterification may be accomplished by any suitable technique such as by reaction of the alkoxylated precursor with acetic anhydride. Thereafter, a suitable sulfonating agent such as sulfuric acid may be used to sulfonate the aryl nucleus. The resulting product may then be neutralized with a suitable base such as sodium hydroxide in order to neutralize the sulfonic acid group to the corresponding salt and to hydrolyze the acetic anhydride ester to provide a terminal hydroxyl group on the polyalkylene oxide chain.

The following examples illustrate the preparation of the preferred aliphatic aryl polyalkoxyol sulfonates characterized by formula (4) above.

EXAMPLE 1

Preparation of sodium nonyl benzene polyethoxyol sulfonate containing 5.4 ethylene oxide units.

One mole of ethoxylated nonyl phenol containing an average of 5.4 ethylene oxide units per molecule (available from GAF Corp. as Igepal CO-520) was mixed with 1.5 moles of acetic anhydride. The mixture was stirred and heated under reflux for 2 hours and the volatile materials (acetic acid and excess acetic anhydride) then were distilled off under vacuum. The resulting material had no free hydroxyls as indicated by infrared spectroscopy and consisted of the acetylated derivative of the starting ethoxylated nonyl phenol. This material was mixed with two volumes of fuming sulfuric acid (10% $SO_3$) with cooling so that the temperature did not rise over 40° C. The mixture was stirred at room temperature for about five hours and was then partially neutralized to a pH of about 5 by the cautious addition of sodium hydroxide. The resulting mixture was extracted three times with chloroform, the chloroform extracts were combined and the chloroform was distilled off. The residue was dissolved in 5 volumes of water containing two equivalents of sodium hydroxide and was refluxed for two hours. The water was finally evaporated off to yield the desired product in an overall yield of about 80%.

EXAMPLE 2

Preparation of sodium nonyl benzene polyethoxyol sulfonate containing 6 ethylene oxide units.

This material was prepared in the same fashion as described in Example 1, except that the starting material was an ethoxylated nonyl phenol containing an average of 6.0 ethylene oxide units available from GAF Corp. as Igepal CO-530.

EXAMPLE 3

Preparation of sodium dodecyl benzene polyethoxyol sulfonate containing 3 ethylene oxide units.

The acetate ester of commercially available 2-[2-(2-chloroethoxy)-ethoxy]-ethanol was prepared by reaction with acetic anhydride and then purified by distillation. This material (1 mole) was added to a solution of 1 mole of the sodium salt of dodecyl phenol (prepared from dodecyl phenol and sodium hydride) in tetrahydrofurane. The mixture was heated under reflux for five hours, the residue (sodium chloride) was filtered off and the solvent was evaporated to yield the acetate ester of dodecyl phenol ethoxylated with exactly three ethylene oxide units. This ester was then sulfonated and neutralized similarly as described in Example 1 to yield the desired surface active material.

It will be recognized that similar reaction routes can be employed in synthesizing the various other aliphatic aryl polyalkoxyol sulfonates which may be employed in accordance with the present invention. For example, the succinimido linked surfactants characterized by formula (2) above can be prepared by reacting the appropriate aliphatic substituted succinic acid anhydride with an amino phenol to yield a compound of type (B). This can be ethoxylated by methods well known in the art to yield a compound of type (C) as indicated by the following reaction:

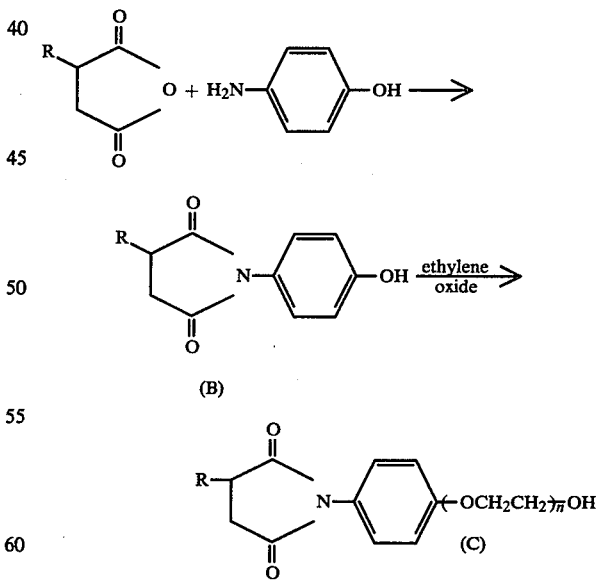

The product (C) of this reaction can then be sulfonated to the desired surface-active material by the method outlined in Example 1.

To demonstrate the effect of total salinity (total dissolved solids content) and divalent metal ion concentrations on the anionic-nonionic surfactants employed in the present invention, surface tension and interfacial tension measurements were taken at various surfactant concentrations and in various brine solutions. The brine solutions employed in this experimental work were prepared from a stock mixed brine solution containing 19.3 weight percent sodium chloride, 7.7 weight percent calcium chloride, and 3.0 weight percent magnesium chloride to provide a total salinity of 30 weight percent. The stock solution was mixed with distilled water to form the brines of the various salinities used in the experimental work. The anionic-nonionic surfactants employed in this experimental work were the nonyl benzene polyethoxyol sulfonates prepared in accordance with Examples 1 and 2 above and the dodecyl benzene polyethoxyol sulfonate prepared in accordance with Example 3. Surface tension measurements were taken for all three of these surfactants and interfacial tension measurements against normal hexadecane and against a crude oil, respectively, were taken for the surfactants produced in accordance with Examples 2 and 3.

Figure 2:
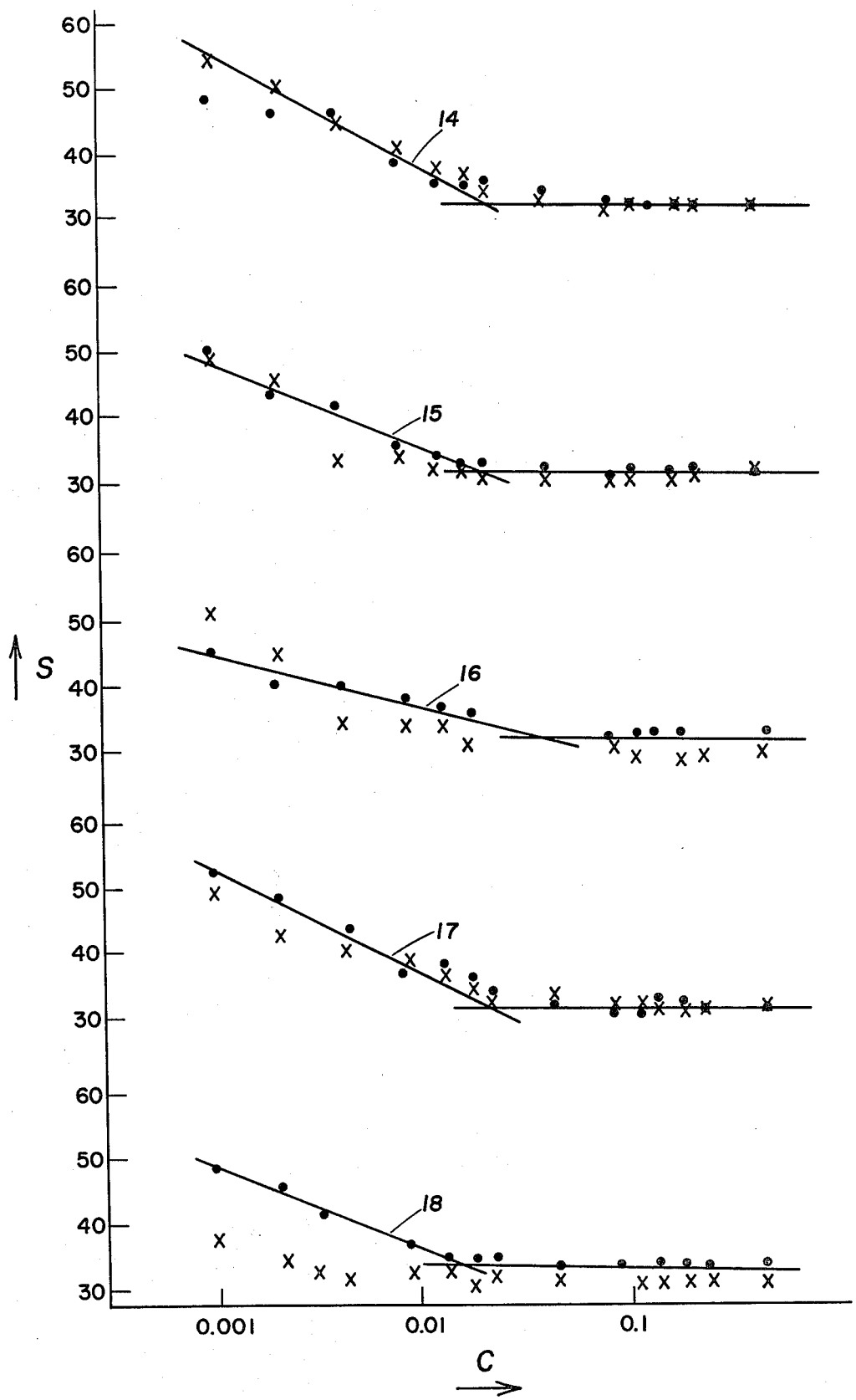
Figure 3:
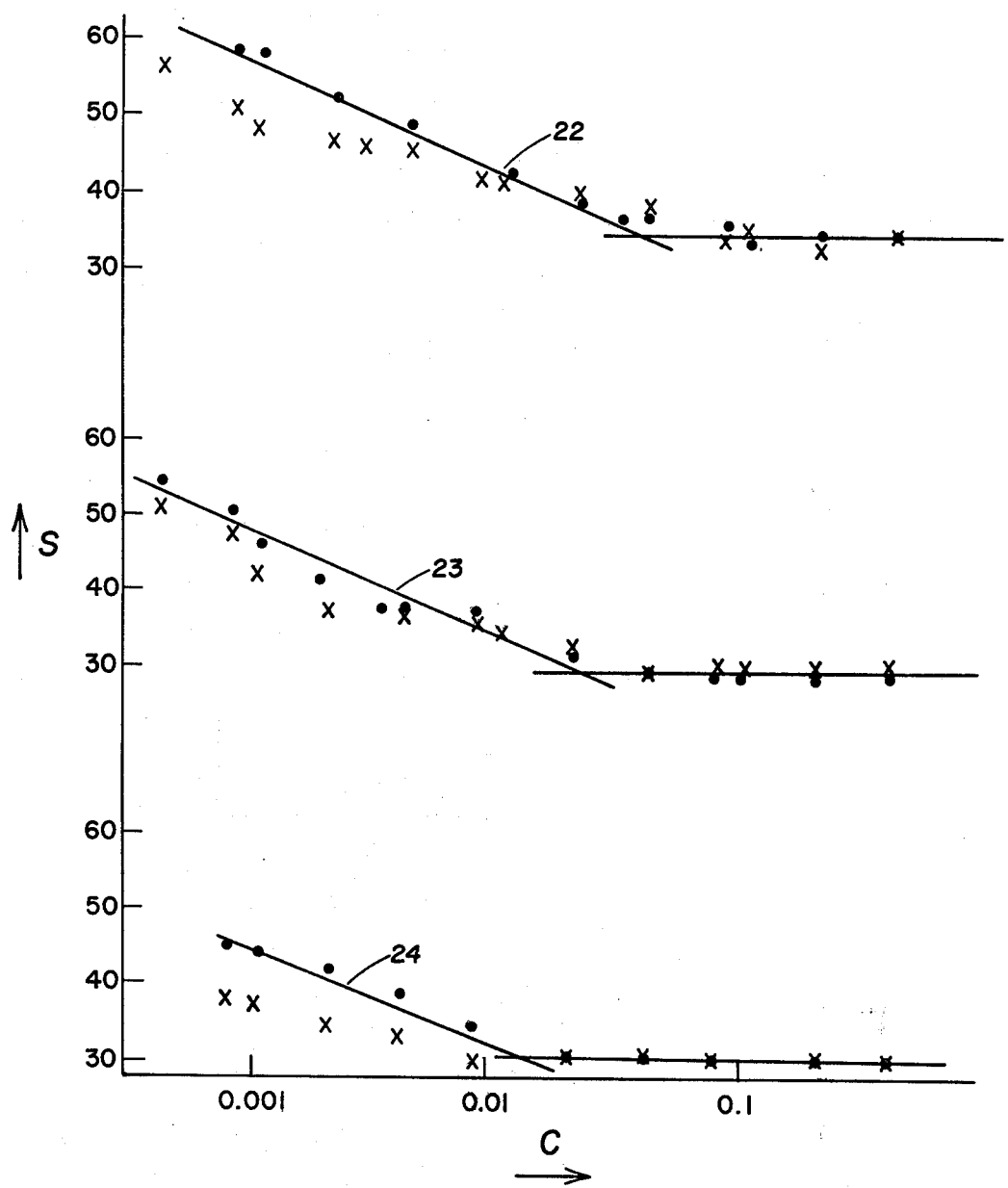

The surface tension measurements taken for aqueous solutions of the surfactants produced in accordance with Examples 1, 2, and 3 are set forth in FIGS. 1, 2, and 3, respectively. In each of FIGS. 1, 2, and 3, the surface tension, S, in dynes per centimeter is plotted on the ordinate versus the log of the surfactant concentration, C, in weight percent on the abscissa. Also in each of these figures, a separate ordinate scale is provided for each of the curves shown.

In FIG. 1, curve 8 is a plot of surfactant concentration versus surface tension for an aqueous solution of the surfactant in distilled water. Curves 9, 10, 11, and 12 are similar plots for surfactant solutions exhibiting total salinities of 3.6, 8.4, 14.4, and 20.4 weight percent, respectively. The curves are drawn interpolatively to provide two line segments which intersect at the critical micelle concentration. Curves 11 and 12 are drawn for the data points indicated by the legend ●. The data points indicated by the legend X represent measurements taken after the surfactant solutions were aged for several months. In FIG. 2, curve 14 shows the surface tensions observed for the surfactant dissolved in distilled water and curves 15, 16, 17, and 18 show the surface tensions measured for salinities of 4.8, 8.4, 14.4, and 20.4 weight percent, respectively. With respect to curves 14, 15, 16, and 17, the data points indicated by the legend ● show the surface tensions observed within one or two days after solution preparation and the data points indicated by the legend X indicate measurements taken about one month after the surfactant solutions were prepared. With respect to curve 18, the data points indicated by the legend ● were taken within one day after the solutions were prepared and the data points indicated by the legend X were taken about one week later. As in the case of FIG. 1, the curves 14 through 18 are interpolative curves drawn for the data points indicated by ● with little weight given to those indicated by X.

FIG. 3 presents surface tension measurements obtained for aqueous solutions of the dodecyl benzene polyethoxyol sulfonate of Example 3. In FIG. 3, curve 22 shows the surface tensions measured for the surfactant in distilled water and curves 23 and 24 show the surface tensions measured for the surfactant in 2.4 weight percent and 4.8 weight percent brine, respectively. With respect to each of these curves, the data points indicated by the legend ⊖ reflect measurements taken within one day after the solutions were prepared and those data points indicated by X indicate measurements taken five or six days after solution preparation. As in the previous figures, curves 22, 23, and 24 are drawn through the data points indicated by the legend ⊖.

As can be seen by an examination of the data presented in FIGS. 1, 2, and 3, the anionic-nonionic surfactant samples of the present invention exhibit surface activities in brines as high as about 20 percent, corresponding to a divalent metal ion concentration of about 24,000 parts per million. In addition, the various surfactant solutions tested were aged under room temperature conditions for periods ranging from several days to several months and showed no evidence of precipitation.

Figure 4:
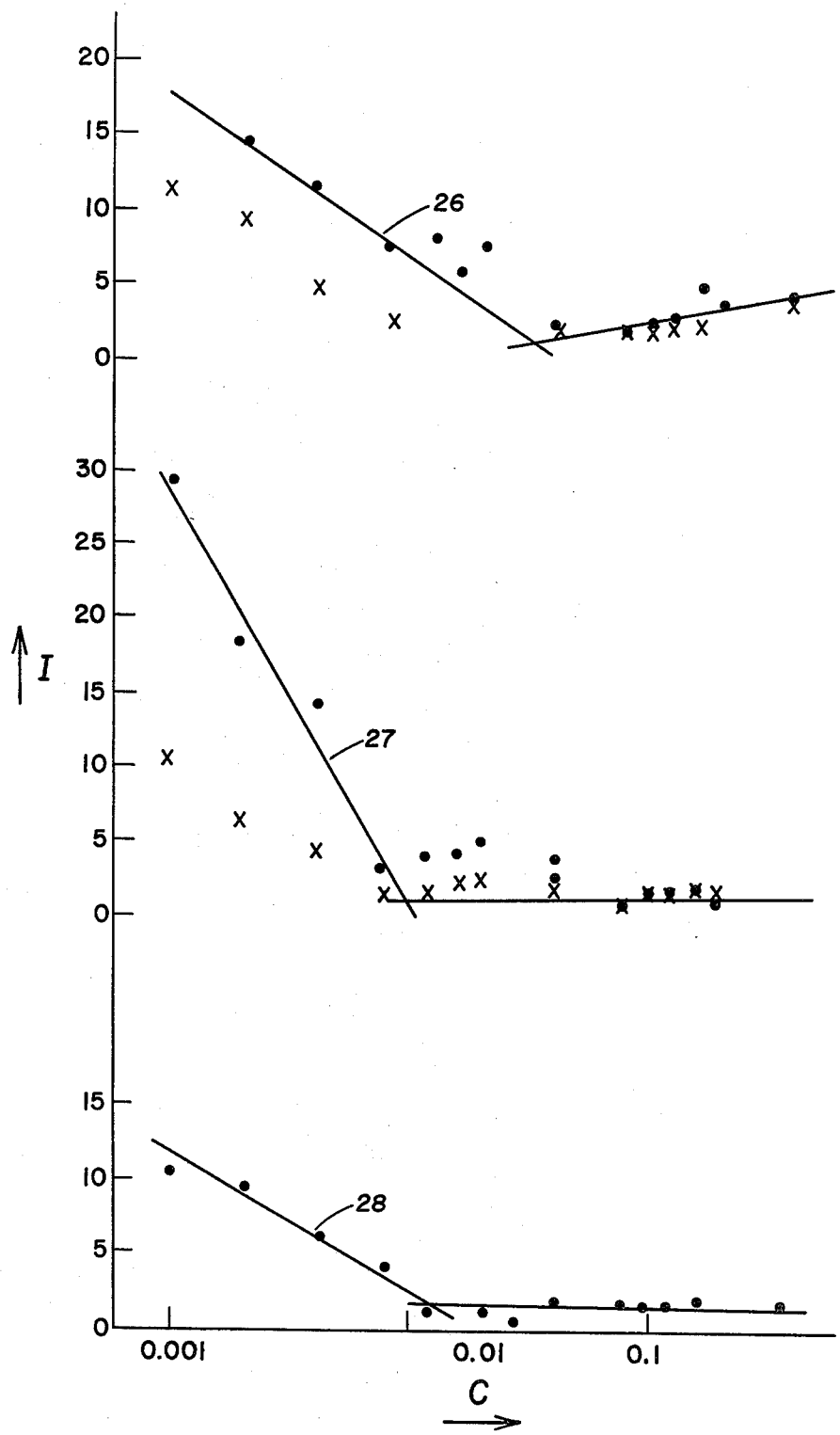
FIG. 4 is a graph illustrating interfacial tensions observed against an oil for mixed brine solutions containing an anionic-nonionic surfactant of the present invention.

FIG. 4 illustrates the results of interfacial tension measurements taken for aqueous solutions of the nonyl benzene polyethoxyol sulfonate produced in accordance with Example 2 against normal hexadecane. The interfacial tension measurements were taken by the microsessile drop procedure. In FIG. 4, curves 26, 27, and 28 indicate the interfacial tensions observed for the surfactant in brines of 6.6, 9.6, and 20.4 weight percent, respectively. The interfacial tension, I, in dynes per centimeter is plotted on the ordinate versus the log of surfactant concentration, C, in weight percent on the abscissa. For the data illustrated by curve 26, the surfactant solutions were aged 8 to 9 days and the interfacial tension measurements were taken immediately after the oil drops were formed (indicated by data points ⊖) and by measuring the same oil drops after standing for 16 hours (indicated by data points X). The data illustrated by curve 27 were obtained in a similar fashion after the surfactant solutions were aged for 10 to 12 days with the data points ⊖ indicating measurements taken immediately after drop formation and the data points X indicating measurements taken with respect to the same oil drops after standing for 16 hours. The data points associated with curve 28 were taken after the solutions were aged for a period of three weeks. Curves 26 and 27 are interpolative curves drawn through the data points indicated by the legend ⊖.

Interfacial tensions measurements were also taken for a series of solutions containing 0.06 weight percent of the previously described dodecyl benzene polyethoxyol sulfonate in increasing brine concentrations against a crude oil. Most of the interfacial tension values were within the range of 0.6 to 0.8 dyne per centimeter and there was no apparent effect of brine concentration on interfacial tension. The oil drops were hard to keep on quartz surfaces indicating that the contact angle through the oil phase was apparently 180°, i.e. the quartz was perfectly water-wet.

The foregoing laboratory data indicate that the aliphatic aryl alkoxyol sulfonates of the present invention tolerate high brine environments and retain their surface activity in these environments with little or no decrease in surface activity observed for increasing salinities and divalent metal ion concentrations. While in theory any decrease in oil-water interfacial tension will result in better microscopic displacement of the reservoir oil by the injected water, it is desirable that the oil-water interfacial tension be reduced to a value of 0.1 dyne per centimeter or less in order to achieve a significant increase in microscopic displacement efficiency. It is preferred that the interfacial tension be reduced to a value of 0.005 dyne per centimeter or less to arrive at optimum conditions for microscopic displacement efficiency.

It will be recalled from the previously presented data that the dodecyl substituted surfactant with its relatively short polyalkoxyol chain produced considerably lower interfacial tensions than those observed for the nonyl substituted surfactants having from 5 to 6 monomer units in the polyalkoxyol chains. While the surfactants of the present invention, like other surfactants employed in low tension waterflooding procedures, may be expected to be specific with regard to the particular reservoir involved, this data would appear to indicate the desirability of employing somewhat longer chain-linked aliphatic groups in order to achieve lower interfacial tensions. More specifically, it is preferred in carrying out the present invention to employ aliphatic aryl polyalkoxyol sulfonates having an aliphatic group containing from 14–20 carbon atoms. Preferably the polyalkoxyol group, particularly in the case of the polyethylene oxide derivative, will contain from 5–15 monomer units.

In view of the compatibility of the aliphatic aryl polyalkoxyol sulfonates of the present invention with divalent metal ions, a preferred application of the present invention is in reservoirs in which the connate water contains significant divalent ion concentrations and in situations where the available flooding medium contains divalent metal ions inconsistent with the use of conventional anionic surfactants such as petroleum sulfonates. Thus a preferred application of the present invention is in those situations in which the reservoir waters and/or the waters employed in formulating the flooding medium exhibit a divalent metal ion concentration within the range of 500 to 24,000 parts per million.

The aliphatic aryl polyalkoxyol sulfonates may be employed in accordance with the present invention in any suitable concentration depending upon the characteristics of the particular reservoir involved and such factors as surfactant consumption, e.g. by adsorption, and dispersion of the surfactant into the reservoir waters. In most cases, it will be preferred to employ the aliphatic aryl polyalkoxyol sulfonate in a concentration within the range of 0.1 to 2.0 weight percent.

While the aqueous solution of aliphatic aryl polyalkoxyol sulfonate may be employed as the sole displacing fluid, it will usually be injected as a discrete slug and then followed by a driving fluid. Preferably, the aqueous surfactant solution is injected in an amount of at least 0.05 pore volume. Typically the size of the surfactant slug will be within the range of 0.05 to 0.6 pore volume. Where an aqueous mobility control slug having a viscosity equal to or greater than the viscosity of the reservoir oil is employed, it normally will be injected after the surfactant slug in an amount within a range of 0.05 to 0.2 pore volume. Thereafter a driving fluid is injected in order to displace the previously injected fluids through the formation. The driving fluid typically may be any water which is locally available and is not incompatible with the formation. The driving fluid is injected in such amount as necessary to carry the recovery process to its conclusion.

The surfactant slug may contain the anionic-nonionic surfactant as the sole surfactant component or it may contain other surfactant additives. However, the use of mixtures of several surfactants is subject to the problem of chromatographic separation noted earlier. Accordingly, if a mixture of surfactants is employed, the aliphatic aryl polyalkoxyol sulfonate should be present in at least a predominant amount with respect to the other surfactant(s) present.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in U.S. Pat. No. 3,927,716 to Burdyn et al. Other well arrangements may be used in carrying out the present invention, examples of which are set forth in the Burdyn et al. patent. By the term "pore volume" as used herein, it is meant that volume of the portion of the formation underlying the well pattern employed, as described in greater detail in the Burdyn et al. patent.

I claim:

1. In a method for the recovery of oil from a subterranean oil reservoir penetrated by spaced injection and production systems in which an aqueous fluid is introduced into said reservoir via said injection system to displace oil to said production system, the improvement comprising employing as at least a portion of the fluid introduced into said injection system a substantially oil-free aqueous liquid containing a water-soluble anionic-nonionic surfactant characterized by the formula

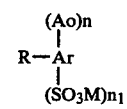

wherein
R is an aliphatic-substituted succinimido group or its succinamic acid derivative,
Ar is a mononuclear or condensed ring dinuclear aryl group,
Ao is a polyalkylene oxide having a terminal hydroxyl group and containing at least 3 alkylene oxide units having 2 or 3 carbon atoms therein,
n is 1 or 2,
M is an alkali metal, ammonium, or substituted ammonium ion, and
$n_1$ is 1 or 2.

2. The method of claim 1 wherein the aliphatic substituent contains from 8 to 25 carbon atoms.

3. The method of claim 1 wherein Ao is a polyethylene oxide group containing from 3 to 20 ethylene oxide units.

4. The method of claim 1 wherein R is the succinamic acid group derivative of the succinimido group and has the formula

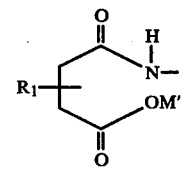

wherein $R_1$ is a $C_8$ to $C_{25}$ aliphatic group and M' is hydrogen or is the same as M.